US012789641B2

(12) United States Patent
Isami et al.

(10) Patent No.: US 12,789,641 B2
(45) Date of Patent: Nov. 10, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP); Kenji Mizutani, Toyota (JP); Tsuyoshi Okada, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/929,018

(22) Filed: Oct. 28, 2024

(65) Prior Publication Data

US 2025/0145018 A1 May 8, 2025

(30) Foreign Application Priority Data

Nov. 8, 2023 (JP) ................................ 2023-190699

(51) Int. Cl.
*B60L 15/20* (2006.01)

(52) U.S. Cl.
CPC ......... *B60L 15/20* (2013.01); *B60L 2240/423* (2013.01); *B60L 2240/647* (2013.01); *B60L 2250/28* (2013.01)

(58) Field of Classification Search
None
See application file for complete search history.

(56) References Cited

U.S. PATENT DOCUMENTS

2013/0035817 A1 2/2013 Bahar et al.
2014/0195088 A1 7/2014 Schuessler
2018/0281619 A1 10/2018 Suzuki et al.
2021/0229550 A1 7/2021 Isami
2021/0387529 A1 12/2021 Oh et al.
2022/0041063 A1 2/2022 Isami et al.
(Continued)

FOREIGN PATENT DOCUMENTS

DE 102019211826 A1 * 1/2021 ............. B62K 23/02
JP H11198675 A * 7/1999
(Continued)

OTHER PUBLICATIONS

Machine translation of JP-H11198675-A (Year: 1999).*
Machine translation of DE-102019211826-A1 (Year: 2021).*
Machine translation of JP-2004066906-A (Year: 2004).*

*Primary Examiner* — Anne Marie Antonucci
*Assistant Examiner* — Kyle S Park
(74) *Attorney, Agent, or Firm* — Finnegan, Henderson, Farabow, Garrett and Dunner, LLP

(57) ABSTRACT

A battery electric vehicle includes an electric motor as a driving source. The battery electric vehicle includes: a driving operation member used to drive the battery electric vehicle; a pseudo shifting operation member that imitates an operation member used to perform a shifting operation of a manual transmission internal combustion engine vehicle; and a processor that controls the battery electric vehicle according to operation of the driving operation member. The processor is configured to execute, according to selection by a driver, a control mode in which an amount of operation input to the pseudo shifting operation member by the driver is associated with torque of the electric motor.

13 Claims, 9 Drawing Sheets

(56) References Cited

U.S. PATENT DOCUMENTS

| | | | | |
|---|---|---|---|---|
| 2022/0041155 | A1 | 2/2022 | Isami et al. | |
| 2022/0063494 | A1 | 3/2022 | Duo' et al. | |
| 2022/0194410 | A1 * | 6/2022 | Kim | B60W 50/16 |
| 2024/0083259 | A1 * | 3/2024 | Ikezawa | B60L 15/20 |

FOREIGN PATENT DOCUMENTS

| | | | | | |
|---|---|---|---|---|---|
| JP | 2004066906 | A | * | 3/2004 | |
| JP | 2005-521597 | A | | 7/2005 | |
| JP | 2018-166386 | A | | 10/2018 | |
| JP | 6787507 | B1 | | 11/2020 | |
| JP | 2022-030814 | A | | 2/2022 | |
| JP | 2022-030834 | A | | 2/2022 | |
| WO | WO 03/085481 | A2 | | 10/2003 | |
| WO | WO-2019187518 | A1 | * | 10/2019 | G05G 1/04 |

* cited by examiner

BATTERY ELECTRIC VEHICLE

CROSS-REFERENCE TO RELATED APPLICATION

This application claims priority to Japanese Patent Application No. 2023-190699 filed on Nov. 8, 2023, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) discloses a battery electric vehicle that can simulate manual shifting operations of a vehicle with a manual transmission powered by an internal combustion engine (hereinafter referred to as "manual transmission internal combustion engine vehicle") by controlling an electric motor.

In addition to JP 6787507 B, Japanese Unexamined Patent Application Publication Nos. 2022-030834 (JP 2022-030834 A) and 2022-030814 (JP 2022-030814 A) also disclose a battery electric vehicle that can simulate manual shifting operations.

Each manual transmission internal combustion engine vehicle has a different operation feel depending on the vehicle model. The operation feel also changes over time. Some drivers have their preferred or familiar operation feel.

The above technique allows a driver to experience as if he or she were operating a manual transmission internal combustion engine vehicle while driving a battery electric vehicle. As described above, research has been conducted on replicating the operations specific to a manual transmission internal combustion engine vehicle by a battery electric vehicle. However, research on replicating the operation feel of a manual transmission internal combustion engine vehicle by a battery electric vehicle has not progressed as much.

SUMMARY

The present disclosure provides a battery electric vehicle that allows a driver to experience as if he or she were operating a manual transmission internal combustion engine vehicle with his or her preferred operation feel.

One aspect of the present disclosure is a battery electric vehicle that includes an electric motor as a driving source. The battery electric vehicle includes: a driving operation member used to drive the battery electric vehicle; a pseudo shifting operation member that imitates an operation member used to perform a shifting operation of a manual transmission internal combustion engine vehicle; and a processor that controls the battery electric vehicle according to operation of the driving operation member. The processor is configured to execute, according to selection by a driver, a control mode in which an amount of operation input to the pseudo shifting operation member by the driver is associated with torque of the electric motor. The pseudo shifting operation member is configured to change movement of the pseudo shifting operation member that occurs in response to operation performed by the driver.

In the above battery electric vehicle, the pseudo shifting operation member may be configured to change either or both of a magnitude of a reaction force that is generated in response to operation performed by the driver and an amount of stroke of the pseudo shifting operation member that occurs in response to the operation performed by the driver.

In the above battery electric vehicle, the magnitude of the reaction force of the pseudo shifting operation member that is generated in response to the operation performed by the driver and the amount of stroke of the pseudo shifting operation member that occurs in response to the operation performed by the driver may be settable by the driver.

The battery electric vehicle of the present disclosure has the control mode in which the amount of operation input to the pseudo shifting operation member is associated with torque of the electric motor. The pseudo shifting operation member can adjust its movement that occurs in response to the operation performed by the driver. This allows the driver to customize the operation feel of the pseudo shifting operation member to his or her preference and experience as if he or she were operating a manual transmission internal combustion engine vehicle while driving the battery electric vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Configuration of Power System of Battery Electric Vehicle

Figure 1:
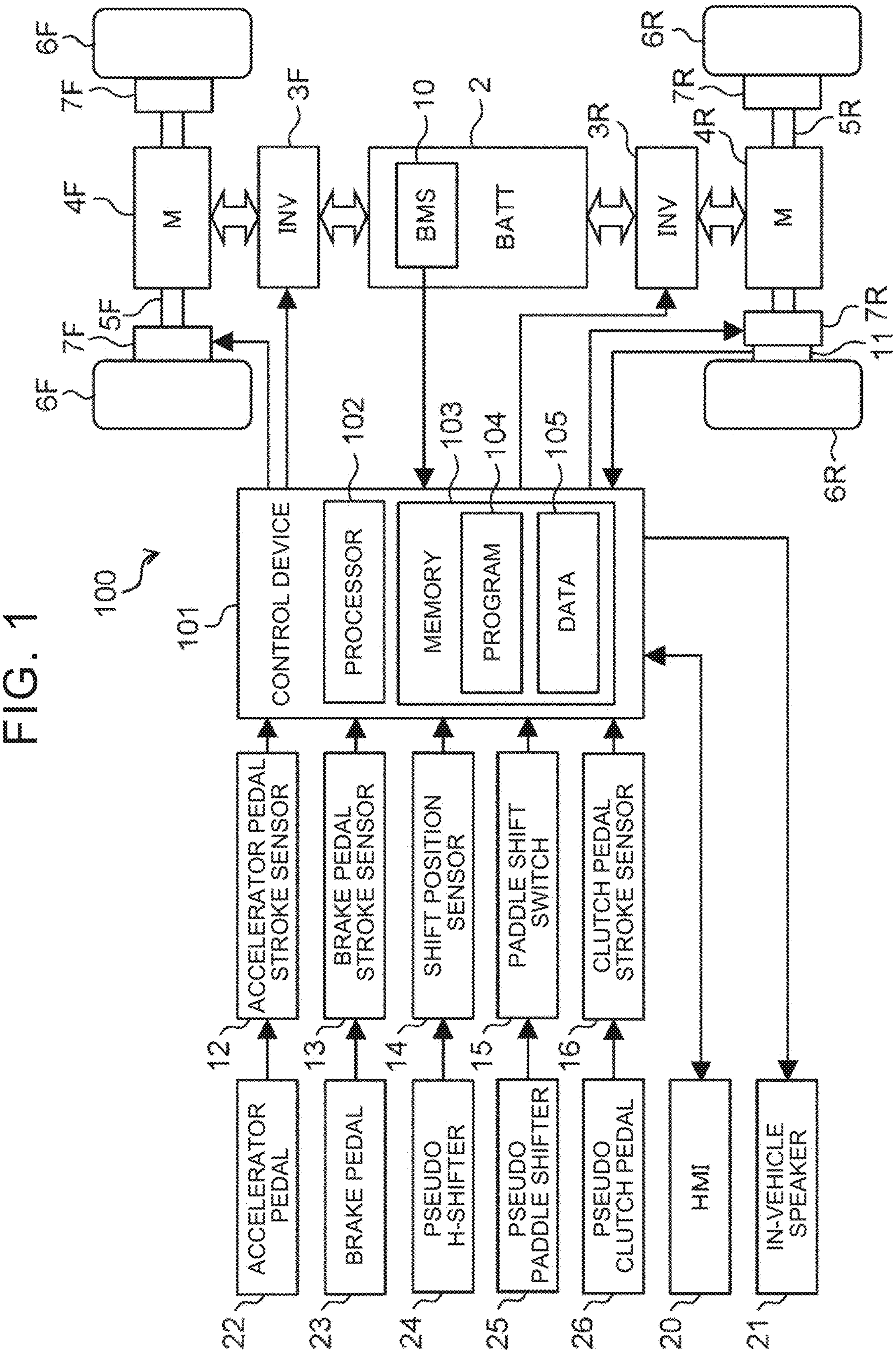
FIG. 1 shows the configuration of a battery electric vehicle according to an embodiment of the present disclosure.

FIG. 1 schematically shows the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at its front and rear as traction power sources. The electric motors 4F, 4R are, for example, three-phase alternating current (AC) motors. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The front electric motor 4F and the rear electric motor 4R are equipped with inverters (INV) 3F, 3R, respectively. The front inverter 3F and the rear inverter 3R are each connected to a battery (BATT) 2. The battery 2 stores electrical energy for driving the electric motors 4F, 4R. That is, the battery electric vehicle 100 is a battery electric vehicle (BEV) that runs on the electrical energy stored in the battery 2. The inverters 3F, 3R are, for example, voltage inverters, and control the torque of the electric motors 4F, 4R by pulse width modulation (PWM) control, respectively.

2. Configuration of Control System of Battery Electric Vehicle

Next, the configuration of a control system of the battery electric vehicle 100 will be described with reference to FIGS. 1 to 4.

The battery electric vehicle 100 includes a battery management system (BMS) 10. The battery management system 10 is a device that monitors the cell voltage, current, temperature, etc. of the battery 2. The battery management system 10 has a function to estimate the state of charge (SOC) of the battery 2.

The battery electric vehicle 100 includes a vehicle speed sensor 11. At least one of wheel speed sensors, not shown, mounted on the right and left front wheels 6F and the right and left rear wheels 6R is used as the vehicle speed sensor 11. The battery electric vehicle 100 further includes an accelerator pedal stroke sensor 12. The accelerator pedal stroke sensor 12 is mounted on an accelerator pedal 22, and outputs a signal indicating the amount of depression of the accelerator pedal 22, i.e., the accelerator operation amount. The battery electric vehicle 100 further includes a brake pedal stroke sensor 13. The brake pedal stroke sensor 13 is mounted on a brake pedal 23, and outputs a signal indicating the amount of depression of the brake pedal 23, i.e., the brake operation amount.

The accelerator pedal 22 and the brake pedal 23 are driving operation members used to drive the battery electric vehicle 100. In addition to these driving operation members, the battery electric vehicle 100 includes pseudo shifting operation members that imitate operation members used to perform shifting operations of a manual transmission internal combustion engine vehicle. The pseudo shifting operation members include a pseudo H-shifter 24, a pseudo paddle shifter 25, and a pseudo clutch pedal 26, which will be described below.

Figure 2:
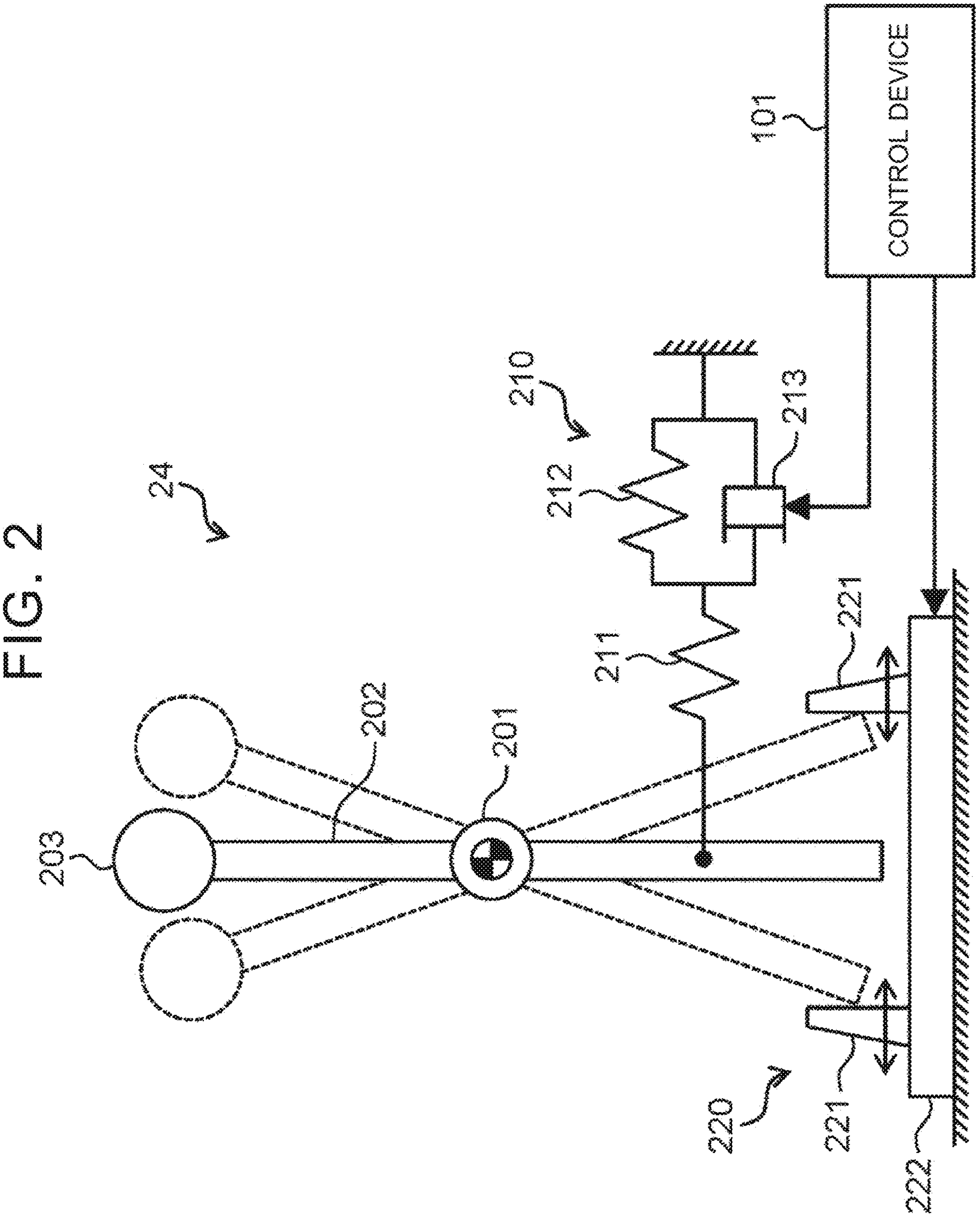
FIG. 2 is a schematic diagram showing a configuration example of a pseudo H-shifter.

The pseudo H-shifter 24 is a dummy different from a real H-shifter. FIG. 2 is a schematic diagram of the pseudo H-shifter 24 on a console as viewed in the front-rear direction. The left-right direction in FIG. 2 is the left-right direction of the pseudo H-shifter 24, and the up-down direction in FIG. 2 is the up-down direction of the pseudo H-shifter 24. As shown in FIG. 2, the pseudo H-shifter 24 includes: a shift stick 202 having a shift knob 203; a reaction force device 210; and a stroke limiter 220. The shift stick 202 is attached to the console via a fulcrum 201 so as to be movable between shift positions along an H-pattern gate. However, since the battery electric vehicle 100 does not have an actual transmission, the shift positions of the pseudo H-shifter 24 are virtual shift positions. The reaction force device 210 and the stroke limiter 220 will be described later.

FIG. 1 will be referred to again. The pseudo H-shifter 24 is provided with a shift position sensor 14. The shift position sensor 14 outputs a signal indicating the shift position selected by the pseudo H-shifter 24.

Figure 3:
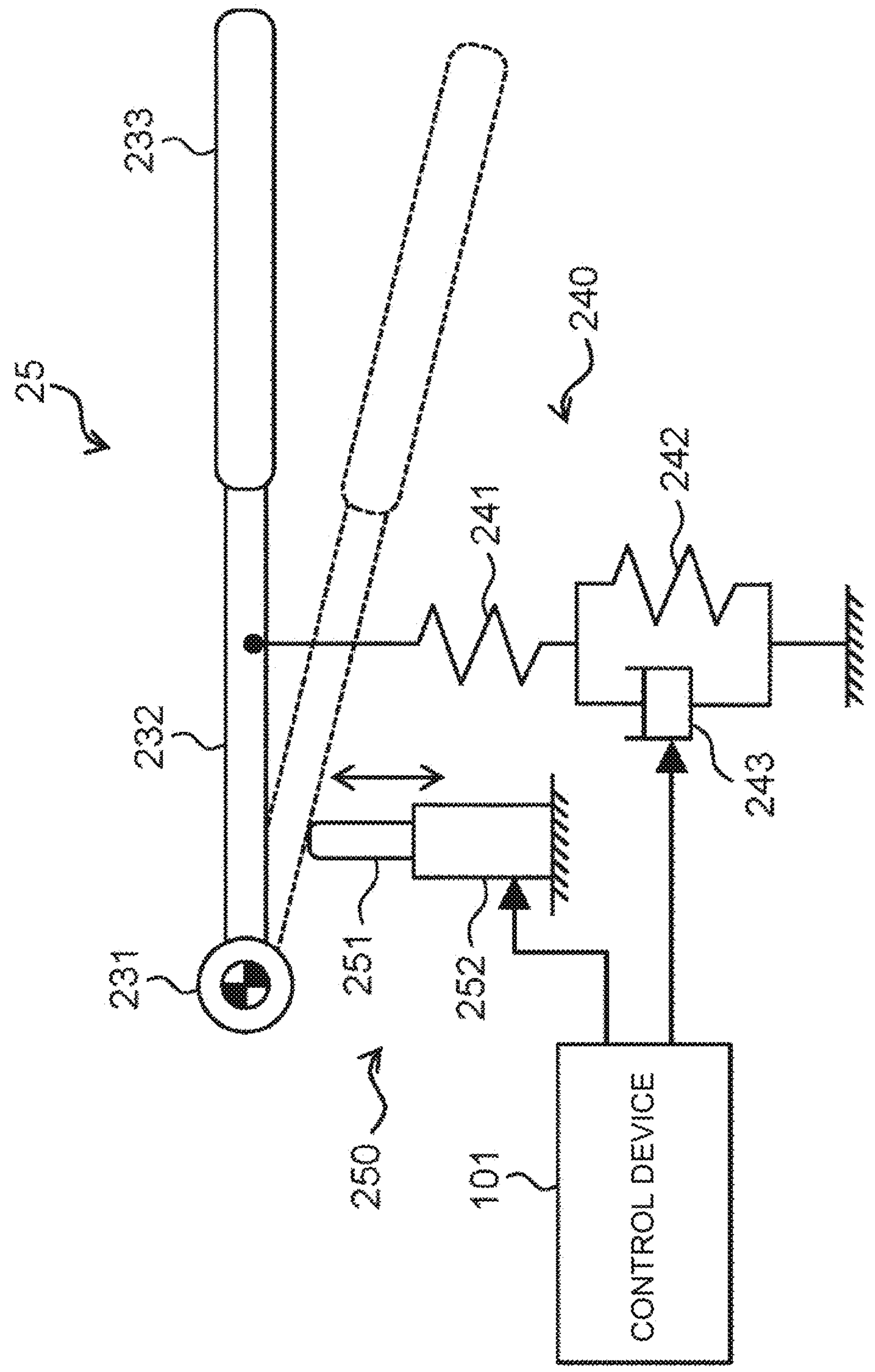
FIG. 3 is a schematic diagram showing a configuration example of a pseudo paddle shifter.

The pseudo paddle shifter 25 is a dummy different from a real paddle shifter that is a type of sequential shifter. The pseudo paddle shifter 25 includes levers attached to the right and left side of a steering wheel, and the right and left levers are independently movable. FIG. 3 is a schematic diagram of the pseudo paddle shifter 25 as viewed from the side of the steering wheel. As shown in FIG. 3, the pseudo paddle shifter 25 includes a lever 232, a paddle 233, a reaction force device 240, and a stroke limiter 250. Note that only the lever 232 attached to the right side of the steering wheel and the components related to this lever 232 are representatively shown in FIG. 3. The lever 232 is attached to the steering wheel or a steering column via a fulcrum 231 so that the driver can move the lever 232 by operating the paddle 233. The reaction force device 240 and the stroke limiter 250 will be described later.

FIG. 1 will be referred to again. The pseudo paddle shifter 25 is provided with a paddle shift switch 15. The paddle shift switch 15 outputs an upshift signal when the right lever 232 is pulled, and outputs a downshift signal when the left lever 232 is pulled.

Figure 4:
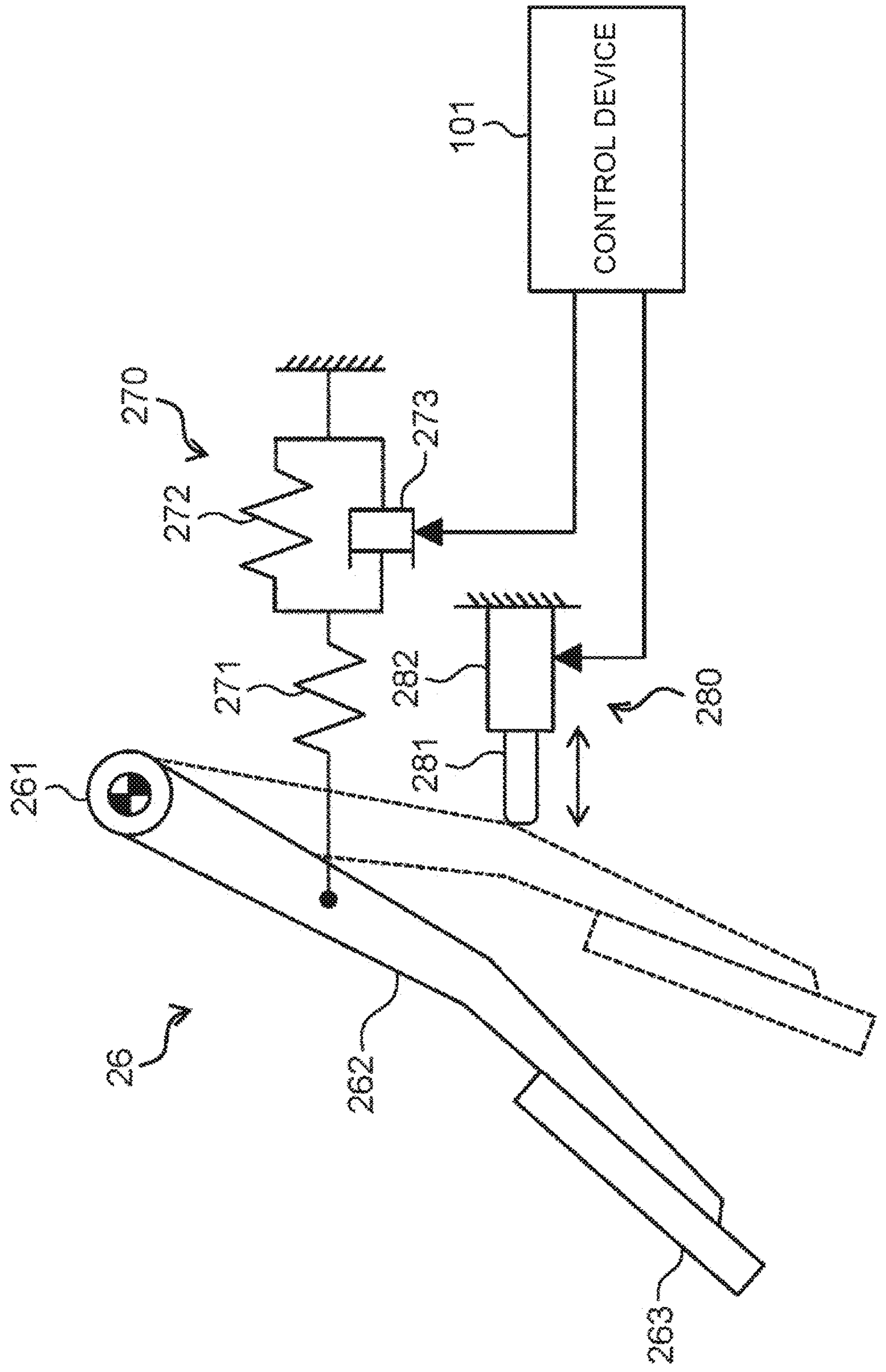
FIG. 4 is a schematic diagram showing a configuration example of a pseudo clutch pedal.

The pseudo clutch pedal 26 is a dummy different from a real clutch pedal. The pseudo clutch pedal 26 has a structure imitating a clutch pedal of a conventional manual transmission internal combustion engine vehicle. FIG. 4 is a schematic diagram of the pseudo clutch pedal 26 as viewed from the side. As shown in FIG. 4, the pseudo clutch pedal 26 includes a lever 262, a pedal 263, a reaction force device 270, and a stroke limiter 280. The lever 262 is mounted at the driver's feet via a fulcrum 261 in such a manner that the driver can move the lever 262 by depressing the pedal 263. A start position of the lever 262 is a position when no depressing force is applied to the pedal 263, and an end position of the lever 262 is a position when the pedal 263 is depressed all the way down. The driver can operate the lever 262 from the start position to the end position by depressing the pedal 263. The reaction force device 270 and the stroke limiter 280 will be described later.

FIG. 1 will be referred to again. The pseudo clutch pedal 26 is provided with a clutch pedal stroke sensor 16. The clutch pedal stroke sensor 16 outputs a signal indicating the amount of depression of the pseudo clutch pedal 26. Since the battery electric vehicle 100 does not have an actual clutch, the amount of operation of the pseudo clutch pedal 26, i.e., the clutch operation amount, is a virtual clutch operation amount.

The battery electric vehicle 100 includes a human-machine interface (HMI) 20 that is an interface with the driver, and an in-vehicle speaker 21. The HMI 20 includes a touch panel display. The HMI 20 displays information on the touch panel display and receives inputs from the driver through touch operations on the touch panel display. The in-vehicle speaker 21 is configured to provide information to the driver by voice and to output a pseudo engine sound that will be described later.

The battery electric vehicle 100 includes a control device 101. Sensors and devices to be controlled that are mounted on the battery electric vehicle 100 are connected to the control device 101 via an in-vehicle network. In addition to the battery management system 10, the vehicle speed sensor 11, the accelerator pedal stroke sensor 12, the brake pedal stroke sensor 13, the shift position sensor 14, the paddle shift switch 15, and the clutch pedal stroke sensor 16, various other sensors are mounted on the battery electric vehicle 100.

The control device 101 is typically an electronic control unit (ECU). The control device 101 may be a combination of a plurality of ECUs. The control device 101 includes at least a processor 102 and a memory 103. The memory 103 includes a random access memory (RAM) for temporarily recording data and a read-only memory (ROM) for storing a program 104 that is executable by the processor 102 and various types of data 105 related to the program. The program 104 is composed of a plurality of instructions. The processor 102 reads and executes the program 104 and the data 105 from the memory 103 and generates control signals based on signals acquired from the sensors. The control device 101 may include one processor 102 or may include a plurality of processors 102.

The control device 101 can control the battery electric vehicle 100 in various control modes. The driver can select a control mode by performing a touch operation on the touch panel display of the HMI 20. Specifically, when a touch operation is performed on the touch panel display of the HMI 20, one or more programs 104 associated with the individual touch operation are read from the memory 103 and executed by the processor 102. The control modes of the battery electric vehicle 100 by the control device 101 that can be selected by the driver by operating the HMI 20 will be described below.

3. Control Modes of Battery Electric Vehicle

Figure 5:
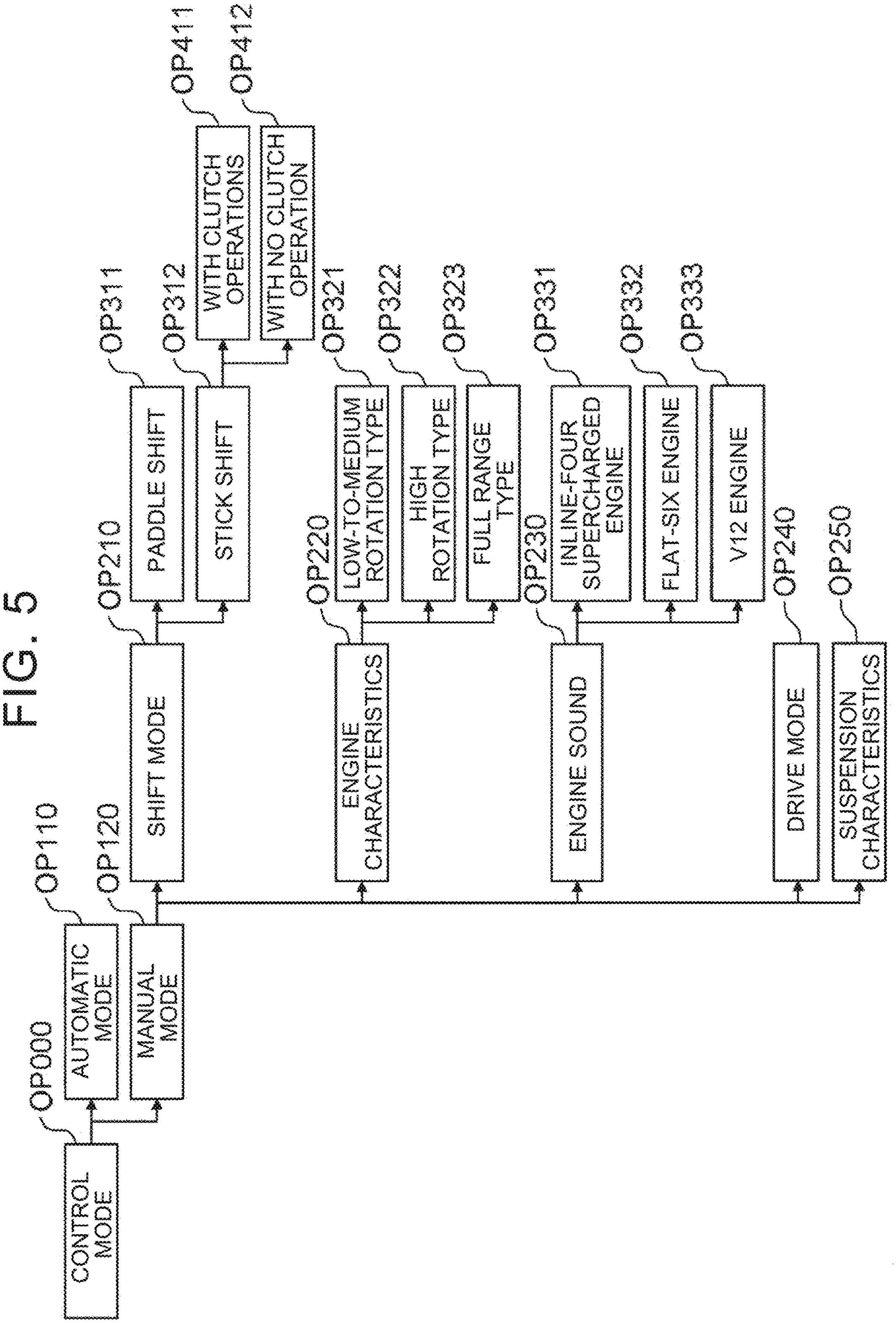
FIG. 5 is a tree diagram showing an example of control modes of the battery electric vehicle that can be selected by a control device.
Figure 6:
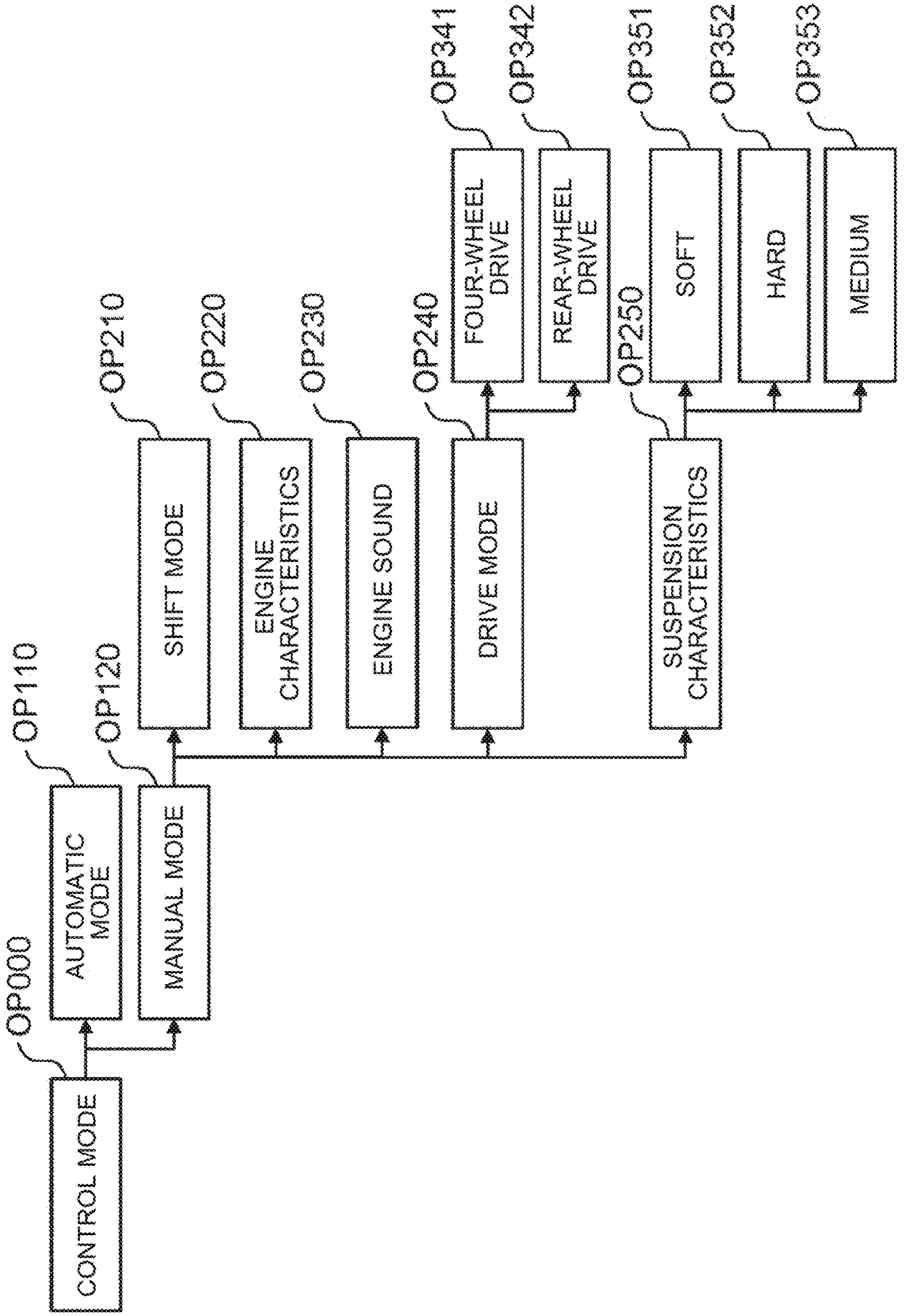
FIG. 6 is a tree diagram showing an example of the control modes of the battery electric vehicle that can be selected by the control device.

FIGS. 5 and 6 are tree diagrams showing an example of the control modes of the battery electric vehicle 100 that can be selected by the control device 101. A selection screen is displayed on the touch panel display of the HMI 20 according to the control tree shown in FIG. 5.

The initial screen of the HMI 20 displays an option "control mode" OP000. When the option "control mode" OP000 is selected, options "automatic mode" OP110 and "manual mode" OP120 are displayed on the touch panel display. When the option "automatic mode" OP110 is selected, the control mode of the battery electric vehicle 100 is switched to an automatic mode. The automatic mode is a control mode in which the battery electric vehicle 100 is driven as a normal battery electric vehicle (BEV). In the automatic mode, the driver can basically drive the battery electric vehicle 100 only by operating the accelerator pedal 22, the brake pedal 23, and the steering wheel, not shown. In the automatic mode, shift operations of the pseudo H-shifter 24, shift operations of the pseudo paddle shifter 25, and clutch operations of the pseudo clutch pedal 26 are disabled.

When the option "manual mode" OP120 is selected, the control mode of the battery electric vehicle 100 is switched to a manual mode. The manual mode is a control mode in which the battery electric vehicle 100 is operated like a manual transmission internal combustion engine vehicle. When the option "manual mode" OP120 is selected, options "shift mode" OP210, "engine characteristics" OP220, "engine sound" OP230, "drive mode" OP240, and "suspension characteristics" OP250 are displayed on the touch panel display. By combining the options OP210 to OP250 as desired, the driver can determine the characteristics of a manual transmission internal combustion engine vehicle that he or she wants the battery electric vehicle 100 to simulate.

The option "shift mode" OP210 is an option to select a shift mode of a manual transmission when the battery electric vehicle 100 is operated like a manual transmission internal combustion engine vehicle. As shown in FIG. 5, when the option "shift mode" OP210 is selected, options "paddle shift" OP311 and "stick shift" OP312 are displayed on the touch panel display. When the option "paddle shift" OP311 is selected, the shift mode of the manual transmission replicated by the battery electric vehicle 100 is switched to a paddle shift mode. The paddle shift mode is a mode in which the pseudo paddle shifter 25 is used for shift operations. In the paddle shift mode, shift operations of the pseudo H-shifter 24 are disabled. In the paddle shift mode, the operation when the gear ratio of the manual transmission is changed is replicated by a shift operation of the pseudo paddle shifter 25. Clutch operations in a real paddle-shift manual transmission are automatically performed by a robot. Therefore, no clutch operations of the pseudo clutch pedal 26 are required in the paddle shift mode. In the paddle shift mode, clutch operations of the pseudo clutch pedal 26 are disabled.

When the option "stick shift" OP312 is selected, a stick shift mode is selected. The stick shift mode is a mode in which the pseudo H-shifter 24 is used for shifting operations. In the stick shift mode, shift operations of the pseudo paddle shifter 25 are disabled. In the stick shift mode, the operation when the gear ratio of the manual transmission is changed is replicated by a shift operation of the pseudo H-shifter 24. Some real H-shifter manual transmissions allow the driver to perform clutch operations while others leave clutch operations to a robot. When the option "stick shift" OP312 is selected, options "with clutch operations" OP411 and "with no clutch operation" OP412 are displayed on the touch panel display. When the option "with clutch operations" OP411 is selected, the stick shift mode is switched to a mode that requires clutch operations of the pseudo clutch pedal 26. On the other hand, when the option "with no clutch operation" OP412 is selected, clutch operations of the pseudo clutch pedal 26 are disabled, and the stick shift mode is switched to a mode that does not require clutch operations of the pseudo clutch pedal 26.

The option "engine characteristics" OP220 is an option to select characteristics of an internal combustion engine when the battery electric vehicle 100 is operated like a manual transmission internal combustion engine vehicle. As shown in FIG. 5, when the option "engine characteristics" OP220 is selected, options "low to medium rotation type" OP321, "high rotation type" OP322, and "full range type" OP323 are displayed on the touch panel display. When the option "low to medium rotation type" OP321 is selected, the characteristics of the internal combustion engine replicated by the battery electric vehicle 100 are switched to a low to medium rotation type in which the torque in a low to medium rotation range is relatively high. When the option "high rotation type" OP322 is selected, the characteristics of the internal combustion engine replicated by the battery electric vehicle 100 are switched to a high rotation type in which the torque in a high rotation range is relatively high. When the option "full range type" OP323 is selected, the characteristics of the internal combustion engine replicated by the battery electric vehicle 100 are switched to a full range type in which the torque is uniform in the entire rotation range. Note that the low to medium rotation type, the high rotation type, and the full range type are merely examples of the engine characteristics that can be replicated by control of the battery electric vehicle 100.

The option "engine sound" OP230 is an option to select an engine sound to be replicated by the battery electric vehicle 100. As shown in FIG. 5, when the option "engine sound" OP230 is selected, options "inline-four supercharged engine" OP331, "flat-six engine" OP332, and "V12 engine" OP333 are displayed on the touch panel display. When the option "inline-four supercharged engine" OP331 is selected, the engine sound replicated by the battery electric vehicle 100 is switched to an engine sound of an inline-four supercharged engine. When the option "flat-six engine" OP332 is selected, the engine sound replicated by the battery electric vehicle 100 is switched to an engine sound of a flat-six engine. When the option "V12 engine" OP333 is selected, the engine sound replicated by the battery electric vehicle 100 is switched to an engine sound of a V12 engine. Note that the inline-four supercharged engine, the flat-six engine, and the V12 engine are merely examples of the engine sound that can be replicated by the battery electric vehicle 100.

The option "drive mode" OP240 is an option to select a drive mode of the battery electric vehicle 100. As shown in FIG. 6, when the option "drive mode" OP240 is selected, options "four-wheel drive" OP341 and "rear-wheel drive" OP342 are displayed on the touch panel display. When the option "four-wheel drive" OP341 is selected, the drive mode of the battery electric vehicle 100 is switched to a four-wheel drive mode. In the four-wheel drive mode, the front wheels 6F are driven by the front electric motor 4F, and the rear wheels 6R are driven by the rear electric motor 4R. Torque distribution between the front wheels 6F and the rear wheels 6R can be fixed or made variable by controlling the electric motors 4F, 4F by the inverters 3F, 3R. When the option "rear-wheel drive" OP342 is selected, the drive mode of the battery electric vehicle 100 is switched to a rear-wheel drive mode. In the rear-wheel drive mode, only the rear wheels 6R are driven by the rear electric motor 4R. The drive mode of the battery electric vehicle 100 may include an option of a front-wheel drive mode in which only the front wheels 6F are driven by the front electric motor 4F, instead of or in addition to the rear-wheel drive mode.

The option "suspension characteristics" OP250 is an option to select suspension characteristics of the battery electric vehicle 100. As shown in FIG. 6, when the option "suspension characteristics" OP250 is selected, options "soft" OP351, "hard" OP352, and "medium" OP353 are displayed on the touch panel display. When the option "soft" OP351 is selected, the suspension characteristics of the battery electric vehicle 100 are switched to a soft mode. In the soft mode, damping forces of the suspensions 7F, 7R are reduced. When the option "hard" OP352 is selected, the suspension characteristics of the battery electric vehicle 100 are switched to a hard mode. In the hard mode, the damping forces of the suspensions 7F, 7R are increased. When the option "medium" OP353 is selected, the suspension characteristics of the battery electric vehicle 100 are switched to a medium mode. In the medium mode, the damping forces of the suspensions 7F, 7R are set to an intermediate value between the value in the soft mode and the value in the hard mode. Since the suspensions 7F, 7R are electronically controlled suspensions, the suspension characteristics of the suspensions 7F, 7R can be adjusted in a wide range. Therefore, the soft mode, the hard mode, and the medium mode are merely examples of the suspension characteristics that can be implemented in the battery electric vehicle 100. The drive mode and the suspension characteristics may be selectable not only in the manual mode but also in the automatic mode.

The driver can switch the control mode of the battery electric vehicle 100 to his or her preference by operating the touch panel display of the HMI 20 according to the control tree described above. The switchable control modes include modes related to driving control of the battery electric vehicle 100 and modes related to sound control of the battery electric vehicle 100. Specifically, the modes related to the option "engine sound" OP230 are the modes related to sound control, and the remaining modes are the modes related to driving control. In the following sections, the driving control and sound control of the battery electric vehicle 100 by the control device 101 will be described.

4. Driving Control of Battery Electric Vehicle

Figure 7:
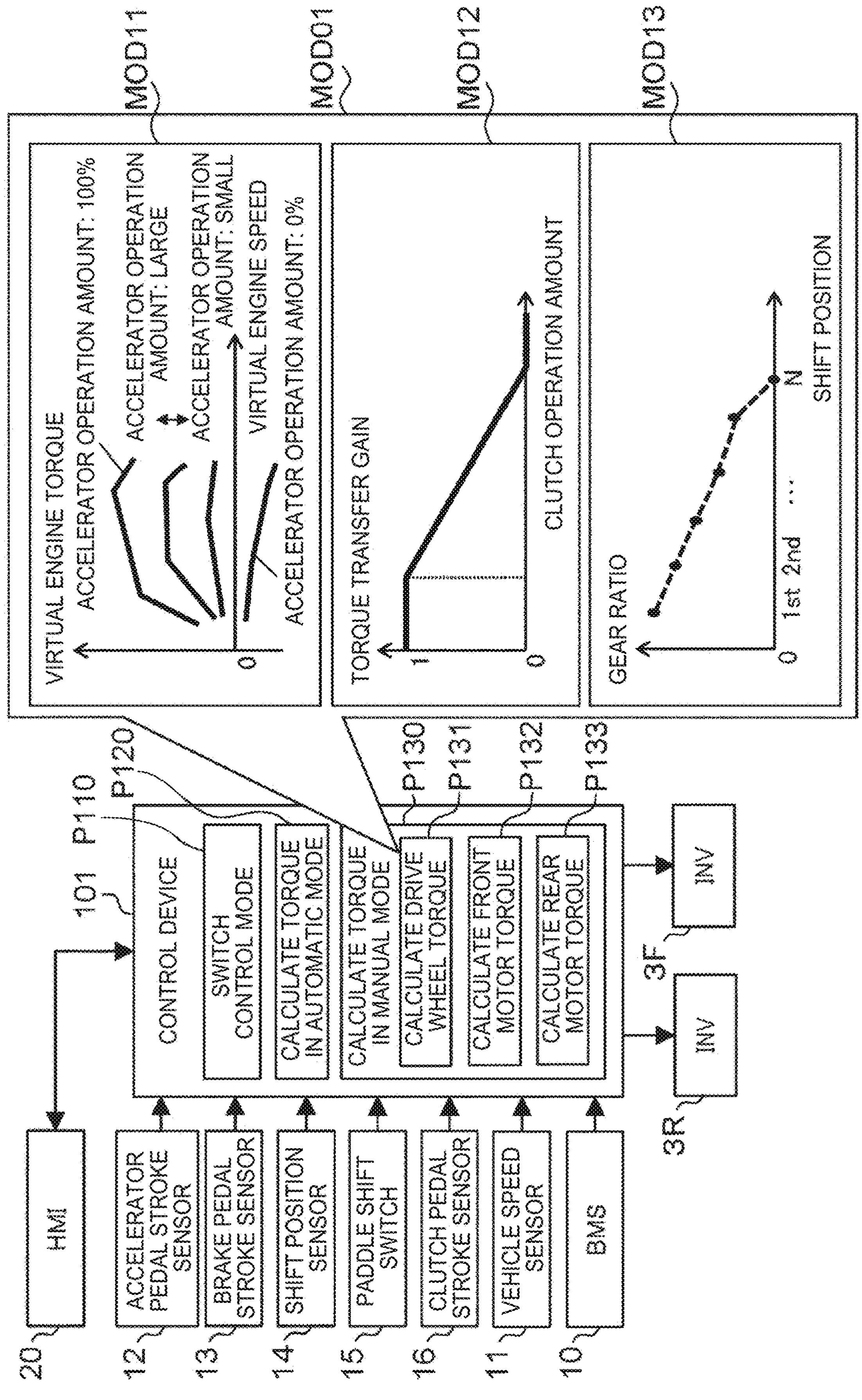
FIG. 7 shows the configuration of a control device related to driving control of the battery electric vehicle.

FIG. 7 shows the configuration of the control device 101 related to the driving control of the battery electric vehicle 100. Specifically, FIG. 7 shows a configuration related particularly to torque control out of the driving control. The processor 102 functions as a driving control device by executing one or more driving control programs 104 stored in the memory 103.

A control mode signal is input from the HMI 20 to the control device 101 functioning as a driving control device. The control mode signal includes information about the control mode selected by the driver. The control device 101 performs a process P110 based on the control mode signal. In the process P110, the control mode is switched according to the control mode signal. When switching the control mode, switching between the automatic mode and the manual mode particularly affects the driving control.

When the control mode is switched to the automatic mode, the control device 101 performs a process P120 of calculating torque in the automatic mode. In the process P120, the control device 101 acquires a vehicle speed from a signal from the vehicle speed sensor 11, and acquires an accelerator operation amount from a signal from the accelerator pedal stroke sensor 12. The control device 101 has a motor torque map using an accelerator operation amount and a vehicle speed as parameters. The control device 101 inputs the acquired vehicle speed and accelerator operation amount to the motor torque map, and controls the inverters 3F, 3R so as to cause the electric motors 4F, 4R to generate the torque obtained from the motor torque map.

When the control mode is switched to the manual mode, the control device 101 performs a process P130 of calculating torque in the manual mode. The process P130 includes a process P131 of calculating the torque to be generated by drive wheels. The process P130 further includes a process P132 and a process P133. The process P132 is a process of calculating the torque to be generated by the front electric motor 4F, and the process P133 is a process of calculating the torque to be generated by the rear electric motor 4R. The processes P132, P133 are performed according to the drive wheel torque calculated in the process P130 and the torque distribution between the front wheels 6F and the rear wheels 6R.

A vehicle model MOD01 is used to calculate the drive wheel torque in the process P131. The vehicle model MOD01 includes an engine model MOD11, a clutch model MOD12, and a transmission model MOD13. An engine virtually implemented by the vehicle model MOD01 will be referred to as "virtual engine," a clutch virtually implemented by the vehicle model MOD01 will be referred to as "virtual clutch," and a transmission virtually implemented by the vehicle model MOD01 will be referred to as "virtual transmission." The engine model MOD11 models the virtual engine. The clutch model MOD12 models the virtual clutch. The transmission model MOD13 models the virtual transmission.

The engine model MOD11 calculates a virtual engine speed and virtual engine torque. The virtual engine speed is calculated from the vehicle speed, the overall reduction ratio, and the slip ratio of the virtual clutch. The virtual engine torque is calculated from the virtual engine speed and the accelerator operation amount. The vehicle speed is acquired from a signal from the vehicle speed sensor 11. The accelerator operation amount is acquired from a signal from the accelerator pedal stroke sensor 12. The overall reduction ratio is a numerical value obtained by multiplying the gear ratio of the virtual transmission by the reduction ratio determined by the mechanical structure from the virtual transmission to the drive wheels. In the engine model MOD11, the relationship between the virtual engine speed and the virtual engine torque is defined for each accelerator operation amount. The driver can select engine characteristics of the engine model MOD11 by operating the HMI 20. In the example shown in FIG. 7, the engine characteristics can be selected from the low to medium rotation type, the high rotation type, and the full range type.

The clutch model MOD12 calculates a torque transfer gain. The torque transfer gain is a gain for calculating the degree of torque transfer of the virtual clutch according to the clutch operation amount. When the stick shift mode with clutch operations is selected as the shift mode, the clutch operation amount is acquired from a signal from the clutch pedal stroke sensor 16. The clutch operation amount is 0% at the start position of the pseudo clutch pedal 26 and is 100% at the end position of the pseudo clutch pedal 26. The clutch model MOD12 gives the torque transfer gain with respect to the clutch operation amount. The torque transfer gain is converted to the clutch torque capacity of the virtual clutch, i.e., the virtual clutch torque capacity. Virtual clutch torque that is input from the virtual clutch to the virtual transmission is calculated based on a comparison between the virtual clutch torque capacity and the virtual engine torque calculated by the engine model MOD11. The clutch model MOD12 calculates the slip ratio by subtracting the torque transfer gain from 1. The slip ratio is used to calculate the virtual engine speed in the engine model MOD11.

When the paddle shift mode is selected as the shift mode, the clutch operation amount to be input to the clutch model MOD12 is calculated using a clutch operation model. When the stick shift mode with no clutch operation is selected as the shift mode, the clutch operation amount to be input to the clutch model MOD12 is calculated using the clutch operation model. The clutch operation model is a model that simulates clutch operations of a model driver. When the paddle shift mode is selected, the vehicle speed, the virtual engine speed, and a signal from the paddle shift switch 15 are input to the clutch operation model. When the stick shift mode with no clutch operation is selected, the vehicle speed, the virtual engine speed, and a signal from the shift position sensor 14 are input to the clutch operation model.

The signal from the paddle shift switch 15 and the signal from the shift position sensor 14 are used to determine the timing of a clutch operation. When a shift operation by the driver is detected based on the signal from the paddle shift switch 15 or the signal from the shift position sensor 14, the clutch operation model maximizes the clutch opening amount to disengage the virtual clutch. The vehicle speed and the virtual engine speed are used to calculate the clutch operation amount. In order to smoothly match the rotational speed of an input shaft of the virtual transmission calculated from the vehicle speed with the virtual engine speed, the clutch operation model calculates the clutch operation amount based on the difference between the rotational speed of the input shaft of the virtual transmission and the virtual engine speed.

The transmission model MOD13 calculates a virtual gear ratio. The virtual gear ratio is a gear ratio determined by the virtual shift position of the virtual transmission. The virtual gear ratio is set for each shift position. The greatest virtual gear ratio is set for first gear, followed by second gear, third gear, fourth gear, . . . in descending order. In the stick shift mode, the shift positions are in one-to-one correspondence with the signals of the shift position sensor 14. In the paddle shift mode, the shift position is shifted up by one gear in response to an upshift signal from the paddle shift switch 15, and the shift position is shifted down by one gear in response to a downshift signal from the paddle shift switch 15. While the number of shift positions of the pseudo H-shifter 24 is physically determined, there is no physical limit on the number of shift positions of the pseudo paddle shifter 25. Therefore, the transmission model MOD13 may be different between the stick shift mode and the paddle shift mode, and the number of shift positions in the paddle shift mode may be greater than the number of shift positions in the stick shift mode.

The transmission model MOD13 calculates virtual transmission torque using the virtual gear ratio and the virtual clutch torque. The virtual transmission torque is virtual torque output from the virtual transmission. The control device 101 controls the inverters 3F, 3R so as to change the output torque of the electric motors 4F, 4R according to the virtual transmission torque. The virtual transmission torque changes discontinuously in response to a change in virtual gear ratio. Such a discontinuous change in virtual transmission torque causes torque shock in the battery electric vehicle 100, creating a feel of a vehicle with a stepped transmission.

The vehicle model MOD01 calculates the drive wheel torque from the virtual transmission torque and the reduction ratio. When the four-wheel drive mode is selected as the drive mode, the drive wheel torque is the sum of the torques applied to the right and left front wheels 6F and the right and left rear wheels 6R. Torque distribution to the front wheels 6F and the rear wheels 6R may be either fixed or actively or passively changed. When the rear-wheel drive mode is selected as the drive mode, the drive wheel torque is the sum of the torques applied to the right and left rear wheels 6R.

In the process P132, the torque of the front electric motor 4F (front motor torque) in the manual mode is calculated by multiplying the drive wheel torque calculated in the process P131 by the torque distribution rate to the front wheels 6F and the reduction ratio from the output shaft of the front electric motor 4F to the front wheels 6F. The control device 101 controls the front inverter 3F so as to cause the front electric motor 4F to generate the front motor torque calculated in the process P132.

In the process P133, the torque of the rear electric motor 4R (rear motor torque) in the manual mode is calculated by multiplying the drive wheel torque calculated in the process P131 by the torque distribution rate to the rear wheels 6R and the reduction ratio from the output shaft of the rear electric motor 4R to the rear wheels 6R. The control device

101 controls the rear inverter 3R so as to cause the rear electric motor 4R to generate the rear motor torque calculated in the process P133.

In the configuration shown in FIG. 7, the battery management system 10 and the brake pedal stroke sensor 13 are not necessarily required for the driving control described above. However, when switching of the control mode affects the SOC of the battery 2, a signal from the battery management system 10 may be used as information for determining whether to allow the control mode to be switched. In a case where the method for operating the battery electric vehicle 100 changes significantly such as when switching the control mode between the automatic mode and the manual mode, the control mode may be switched on the condition that the brake pedal 23 is being depressed. In this case, a signal from the brake pedal stroke sensor 13 can be used as information for determining whether the brake pedal 23 is being depressed.

5. Sound Control of Battery Electric Vehicle

Figure 8:
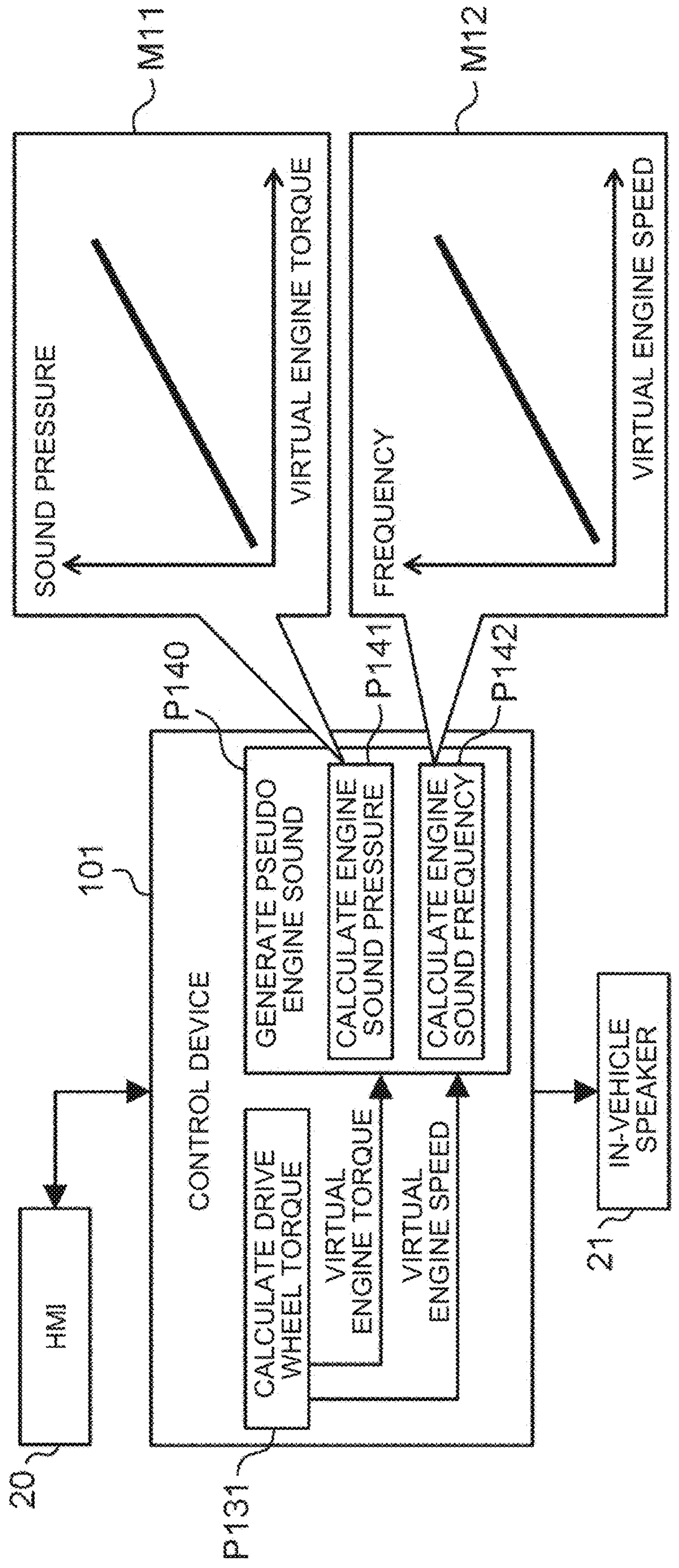
FIG. 8 shows the configuration of the control device related to sound control of the battery electric vehicle.

FIG. 8 shows the configuration of the control device 101 related to the sound control of the battery electric vehicle 100. The processor 102 functions as a sound control device by executing one or more sound control programs 104 stored in the memory 103. The processor 102 functioning as a driving control device and the processor 102 functioning as a sound control device may be different processors or may be the same processor.

The control device 101 functioning as a sound control device can output artificially generated sounds from the in-vehicle speaker 21. One of such artificial sounds is a pseudo engine sound that imitates an engine sound of a conventional internal combustion engine vehicle. When a control mode signal indicating that the manual mode has been selected is received from the HMI 20, the control device 101 functioning as a sound control device performs a process P140. In the process P140, a pseudo engine sound is generated based on the virtual engine torque and virtual engine speed calculated in the process P131.

In the process P140, an engine sound selected by the HMI 20 is used as a sound source of the pseudo engine sound to be generated from the in-vehicle speaker 21. In the example shown in FIG. 8, an engine sound selected from an inline-four supercharged engine, a flat-six engine, and a V12 engine is used as a sound source of the pseudo engine sound. However, in the process P140, the sound from the sound source is not used as it is. In the process P140, the sound pressure of the sound source is changed by, for example, an amplifier, and the frequency of the sound source is changed by, for example, a frequency modulator.

The process P140 includes a process P141 of calculating an engine sound pressure and a process P142 of calculating an engine sound frequency. In the process P141, the sound pressure of the pseudo engine sound is calculated from the virtual engine torque using a sound pressure map M11. The sound pressure map M11 is created so that the sound pressure increases as the virtual engine torque increases. In the process P142, the frequency of the pseudo engine sound is calculated from the virtual engine speed using a frequency map M12. The frequency map M12 is created so that the frequency increases as the virtual engine speed increases. The virtual engine torque and the virtual engine speed change according to the driver's accelerator operation, shift operation, and clutch operation. Changing the sound pressure and frequency of the pseudo engine sound according to the virtual engine torque and virtual engine speed that change as described above can give the driver a feel as if he or she were actually driving a real manual transmission internal combustion engine vehicle.

6. First Embodiment: Customization of Operation Feel

6-1. Overview

The driver of the battery electric vehicle 100 can experience as if he or she were operating a manual transmission internal combustion engine vehicle while driving the battery electric vehicle 100 by changing the control mode to the manual mode. In this case, driving in the manual driving mode will be more enjoyable for the driver if the operation feel of the pseudo shifting operation members can be customized.

For example, an actual H-shifter or clutch pedal mechanically connected to a transmission of a manual transmission internal combustion engine vehicle generates a reaction force in response to the driver's operation. Therefore, if a reaction force simulating a real H-shifter or clutch pedal can be applied in response to the driver's operation of the pseudo H-shifter 24 or pseudo clutch pedal 26, the driver will feel a feedback as if he or she were operating a real H-type shifter or clutch pedal. This gives the driver a more realistic feeling of driving a real manual transmission internal combustion engine vehicle. When a driver who is used to operating a manual transmission internal combustion engine vehicle drives the battery electric vehicle 100, the preferred or familiar operation feel may vary from driver to driver. In such a case, the ease and fun of driving for the driver can be improved if the operation feel of the pseudo shifting operation members can be customized to each driver's preference.

Therefore, in the present embodiment, the pseudo shifting operation members are provided with a mechanism for customizing the operation feel. Hereinafter, the mechanism for customizing the operation feel will be described with reference to FIGS. 2 to 4.

6-2. Mechanism

When operating the pseudo H-shifter 24, the driver holds the shift knob 203 and moves the shift stick 202 to select a shift position. Examples of factors that affect the operation feel at this time include the reaction force generated in response to the driver's operation and the amount of stroke of the shift stick 202.

The reaction force device 210 is a mechanism that generates a reaction force in response to the operation of the shift stick 202 and that allows to adjust the magnitude of the reaction force to be generated. The reaction force device 210 is composed of a first spring 211, a second spring 212, and a variable damper 213. The first spring 211 is connected in series with the variable damper 213, and the second spring 212 is connected in parallel with the variable damper 213.

The variable damper 213 is a damper whose damping force is variable. The variable damper 213 is connected to the control device 101, and the damping force of the variable damper 213 is electronically controlled by the control device 101. When the damping force of the variable damper 213 is reduced, the reaction force generated by the reaction force device 210 decreases accordingly. When the damping force of the variable damper 213 is increased, the reaction force generated by the reaction force device 210 increases accordingly.

The stroke limiter 220 is a mechanism that allows to adjust the amount of stroke of the shift stick 202. The stroke limiter 220 is composed of a pair of right and left stoppers 221 and an actuator 222 for moving the stoppers 221. The stoppers 221 determine the position of the shift stick 202 in the left-right direction, in other words, the range of motion of the shift stick 202 as viewed in the left-right direction. The actuator 222 is connected to the control device 101, and the control device 101 can control the positions of the stoppers 221 to increase or decrease the distance between the stoppers 221.

The magnitude of the reaction force to be generated when the driver operates the pseudo H-shifter 24 and the amount of stroke of the shift stick 202 can thus be controlled by the control device 101. Although FIG. 2 shows the mechanisms that allows to adjust the magnitude of the reaction force and the amount of stroke in the left-right direction, the pseudo H-shifter 24 may include similar mechanisms in the front-rear direction as well. The reaction force device 210 and the stroke limiter 220 are examples of the mechanism for customizing the operation feel. The pseudo H-shifter 24 may include both of these mechanisms or may include one of these mechanisms, or may be configured to customize the operation feel by a mechanism different from these mechanisms.

Examples of factors that affect the operation feel of the pseudo paddle shifter 25 include the reaction force generated when the driver pulls the lever 232 and the amount of stroke of the paddle 233.

The reaction force device 240 is a mechanism that generates a reaction force when the lever 232 is pulled and that allows to adjust the magnitude of the reaction force to be generated. The reaction force device 240 is composed of a first spring 241, a second spring 242, and a variable damper 243. The first spring 241 is connected in series with the variable damper 243, and the second spring 242 is connected in parallel with the variable damper 243. With a mechanism similar to that of the reaction force device 210, the magnitude of the reaction force to be generated by the reaction force device 240 can be controlled by the control device 101.

The stroke limiter 250 is a mechanism that allows to adjust the amount of stroke of the lever 232. The stroke limiter 250 is composed of a pin 251 and a cylinder 252. Rotation of the lever 232 about the fulcrum 231 is restricted by the pin 251. Therefore, the amount of stroke of the lever 232 is determined by the amount of extension of the pin 251 from the cylinder 252. The control device 101 is connected to the cylinder 252, and can change the amount of stroke of the lever 232 by electronically controlling the amount of extension of the pin 251 from the cylinder 252.

The magnitude of the reaction force to be generated when the driver pulls the lever 232 of the pseudo paddle shifter 25 and the amount of stroke of the lever 232 can thus be controlled by the control device 101. The reaction force device 240 and the stroke limiter 250 are examples of the mechanism for customizing the operation feel. The pseudo paddle shifter 25 may include both of these mechanisms or may include one of these mechanisms, or may be configured to customize the operation feel by a mechanism different from these mechanisms.

Examples of factors that affect the operation feel of the pseudo clutch pedal 26 include the reaction force generated when the driver depresses the pedal 263 and the amount of stroke of the pedal 263.

The reaction force device 270 generates a reaction force in response to depression of the pedal 263 by the driver. The reaction force device 270 is composed of a first spring 271, a second spring 272, and a variable damper 273. The first spring 271 is connected in series with the variable damper 273, and the second spring 272 is connected in parallel with the variable damper 273. The first spring 271 and the second spring 272 generate a reaction force in response to depression of the pedal 263, and the driver can operate the pedal 263 from the start position to the end position against the reaction force from the reaction force device 270. With a mechanism similar to that of the reaction force device 210, the magnitude of the reaction force to be generated by the reaction force device 270 can be controlled by the control device 101.

The stroke limiter 280 is a mechanism that allows to adjust the amount of stroke of the pedal 263. The stroke limiter 280 is composed of a pin 281 and a cylinder 282. Rotation of the pedal 263 about the fulcrum 261 is restricted by the pin 281. Therefore, the amount of stroke of the pedal 263 is determined by the amount of extension of the pin 281 from the cylinder 282. The control device 101 is connected to the cylinder 282, and can change the amount of stroke of the pedal 263 by electronically controlling the amount of extension of the pin 281 from the cylinder 282.

The magnitude of the reaction force to be generated when the driver depresses the pedal 263 of the pseudo clutch pedal 26 and the amount of stroke of the pedal 263 can thus be controlled by the control device 101. The reaction force device 270 and the stroke limiter 280 are examples of the mechanism for customizing the operation feel. The pseudo clutch pedal 26 may include both of these mechanisms or may include one of these mechanisms, or may be configured to customize the operation feel by a mechanism different from these mechanisms.

Although the pseudo clutch pedal 26 is a pedal-type operation device that is operated by foot, a lever-type or dial-type operation device that is operated by hand may be provided as a pseudo clutch operation device. The pseudo clutch operation device may have various structures as long as the driver can operate the pseudo clutch operation device from its start position to its end position against the reaction force and can experience an operation feel like a clutch pedal of a conventional manual transmission internal combustion engine vehicle with his or her foot or hand.

6-3. Customization by Driver

Figure 9:
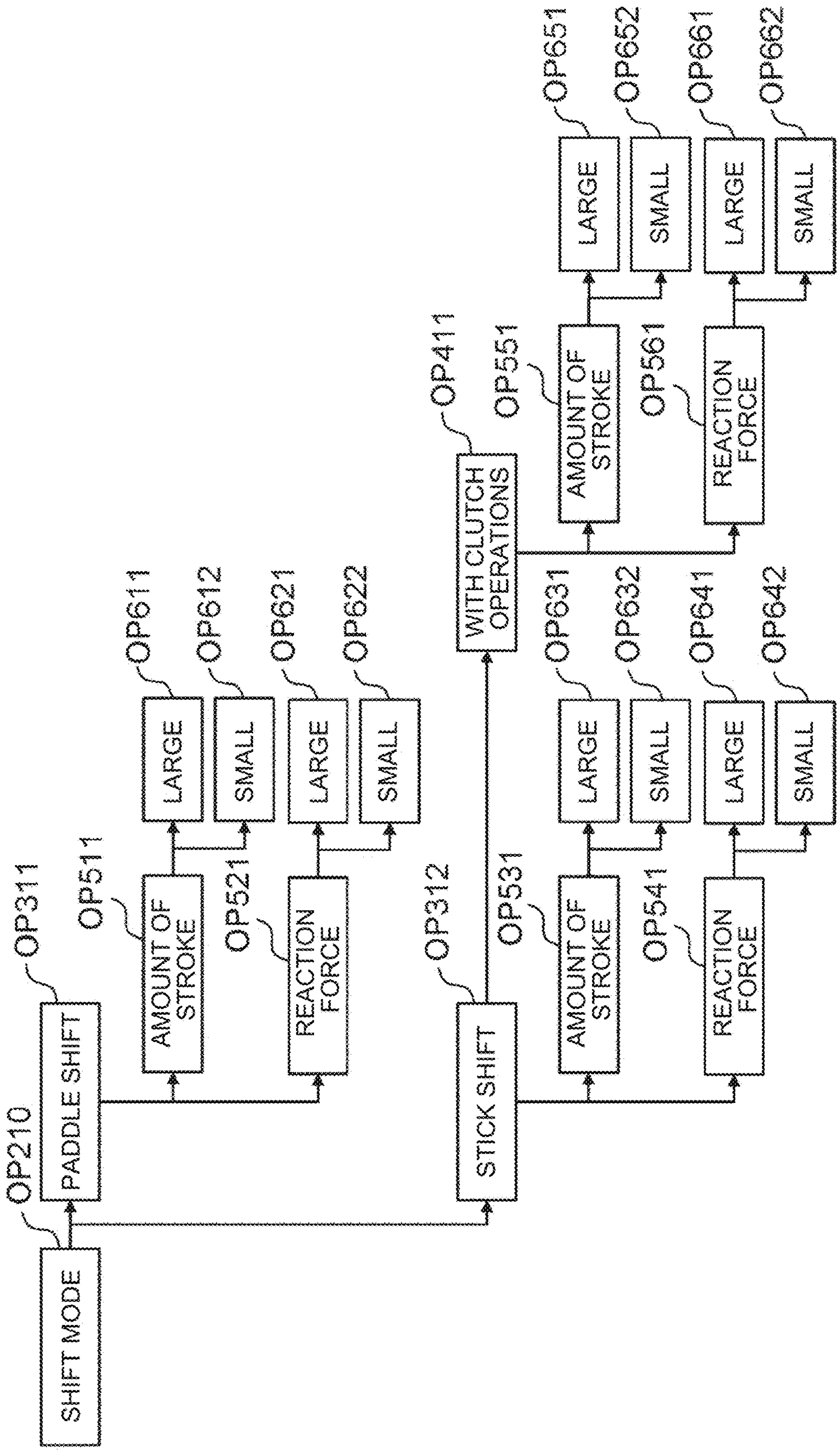
FIG. 9 is a tree diagram showing an example of options related to customization of the operation feel of pseudo shifting operation members.

The driver may be able to customize the operation feel of the pseudo shifting operation members himself or herself. FIG. 9 is a tree diagram showing an example of customizing the operation feel of the pseudo shifting operation members during driving in the manual mode. A selection screen is displayed on the touch panel display of the HMI 20 according to the control tree shown in FIG. 9. The driver can cause the selection screen to be displayed at any time except while the battery electric vehicle 100 is traveling, and customize the operation feel of the pseudo shifting operation members.

When the option "paddle shift" OP311 is selected on the touch panel display of the HMI 20, options "amount of stroke" OP511 and "reaction force" OP521 are displayed on the touch panel display. The option "amount of stroke" OP511 is an option to customize the amount of stroke of the paddle 233. As shown in FIG. 9, when the option "amount of stroke" OP511 is selected, options "large" OP611 and "small" OP612 are displayed on the touch panel display. When the option "large" OP611 is selected, the amount of extension of the pin 251 from the cylinder 252 is reduced. When the option "small" OP612 is selected, the amount of extension of the pin 251 from the cylinder 252 is increased.

The driver can adjust the amount of stroke of the paddle 233 to his or her preference by selecting "large" OP611 or "small" OP612. For example, a driver who prefers a tactile feel of operating the paddle 233 and less chance of an erroneous gear change input can set the amount of stroke to a larger value. Alternatively, a driver who wants to change gears with a light operation feel can set the amount of stroke to a smaller value.

The option "reaction force" OP521 is an option to customize the magnitude of the reaction force to be generated in response to the operation of the paddle 233. When the option "reaction force" OP521 is selected, options "large" OP621 and "small" OP622 are displayed. When the option "large" OP621 is selected, the damping force of the variable damper 243 is increased, so that the reaction force when the driver pulls the lever 232 increases accordingly. When the option "small" OP622 is selected, the damping force of the variable damper 243 is reduced, so that the reaction force when the driver pulls the lever 232 decreases accordingly. The driver can adjust the magnitude of the reaction force when operating the paddle 233 to his or her preference by selecting "large" OP621 or "small" OP622.

When the option "stick shift" OP312 is selected, options "amount of stroke" OP531 and "reaction force" OP541 are displayed on the touch panel display. The option "amount of stroke" OP531 is an option to customize the amount of stroke of the shift stick 202. As shown in FIG. 9, when the option "amount of stroke" OP531 is selected, options "large" OP631 and "small" OP632 are displayed on the touch panel display. When the option "large" OP631 is selected, the actuator 222 increases the distance between the right and left stoppers 221. When the option "small" OP632 is selected, the actuator 222 reduces the distance between the right and left stoppers 221. The driver can adjust the amount of stroke of the shift stick 202 to his or her preference by selecting "large" OP631 or "small" OP632. For example, a driver who is used to driving a manual transmission internal combustion engine vehicle can adjust the amount of stroke of the pseudo H-shifter 24 to close to the amount of stroke he or she is used to. This gives the driver a more realistic feel as if he or she were actually driving a real manual transmission internal combustion engine vehicle.

The option "reaction force" OP541 is an option to customize the magnitude of the reaction force to be generated in response to the operation of the shift stick 202. When the option "reaction force" OP541 is selected, options "large" OP641 and "small" OP642 are displayed. When the option "large" OP641 is selected, the damping force of the variable damper 213 is increased, so that the reaction force of the shift stick 202 in response to the driver's operation increases accordingly. When the option "small" OP642 is selected, the damping force of the variable damper 213 is reduced, so that the reaction force of the shift stick 202 in response to the driver's operation decreases accordingly. The driver can adjust the magnitude of the reaction force when operating the shift stick 202 to his or her preference by selecting "large" OP621 or "small" OP622. For example, adjusting the reaction force to a larger value allows the driver to operate the pseudo H-shifter 24 while feeling a feedback as if the pseudo H-shifter 24 were a real H-shifter mechanically connected to a transmission. A driver who prefers to move the shift stick 202 quickly with a light operation feel rather than to feel a realistic feedback can set the reaction force to a smaller value.

When the option "stick shift" OP312 is selected and then "with clutch operations" OP411 is selected, options "amount of stroke" OP551 and "reaction force" OP561 are displayed on the touch panel display. The option "amount of stroke" OP551 is an option to customize the amount of stroke of the pedal 263. As shown in FIG. 9, when the option "amount of stroke" OP551 is selected, options "large" OP651 and "small" OP652 are displayed on the touch panel display. When the option "large" OP651 is selected, the amount of extension of the pin 281 from the cylinder 282 is reduced. When the option "small" OP652 is selected, the amount of extension of the pin 281 from the cylinder 282 is increased. The driver can adjust the amount of stroke of the pedal 263 to his or her preference by selecting "large" OP651 or "small" OP652. For example, a driver who is used to driving a manual transmission internal combustion engine vehicle can adjust the amount of stroke of the pseudo clutch pedal 26 to close to the amount of stroke he or she is used to. This gives the driver a more realistic feel as if he or she were actually driving a real manual transmission internal combustion engine vehicle.

The option "reaction force" OP561 is an option to customize the magnitude of the reaction force to be generated in response to depression of the pedal 263. When the option "reaction force" OP561 is selected, options "large" OP661 and "small" OP662 are displayed. When the option "large" OP661 is selected, the damping force of the variable damper 273 is increased, so that the reaction force in response to depression of the pedal 263 by the driver increases accordingly. When the option "small" OP662 is selected, the damping force of the variable damper 273 is reduced, so that the reaction force in response to depression of the pedal 263 decreases accordingly. The driver can adjust the magnitude of the reaction force when depressing the pedal 263 to his or her preference by selecting "large" OP661 or "small" OP662. For example, adjusting the reaction force to a larger value allows the driver to operate the pseudo clutch pedal 26 while feeling a feedback as if the pseudo clutch pedal 26 were a real clutch pedal mechanically connected to a transmission. A driver who prefers to move the pedal 263 quickly with a light operation feel rather than to feel a realistic feedback can set the reaction force to a smaller value.

As another example, the driver may be able to select from the above options related to the operation feel through a mobile communication terminal he or she carries with him or her. For example, the driver may be able to install a dedicated application on a smartphone or tablet and connect the smartphone or tablet to the battery electric vehicle 100 to have such a selection screen as described above on the smartphone or tablet.

6-4. Effects

As described above, the battery electric vehicle 100 according to the present embodiment includes the pseudo H-shifter 24, pseudo paddle shifter 25, and pseudo clutch pedal 26 that imitate operation members used to perform shifting operations of a manual transmission internal combustion engine vehicle. Movements of these pseudo shifting operation members can be controlled by the control device 101. This allows the driver to customize the operation feel of the pseudo shifting operation members to his or her preference. The driver can thus drive the battery electric vehicle 100 with his or her preferred or familiar operation feel. This gives the driver a more realistic feel as if he or she were actually driving a real manual transmission internal combustion engine vehicle, and allows the driver to enjoy driving in a way that suits him or her. Even a driver who is not used to driving a manual transmission internal combustion engine vehicle can drive with an operation feel that suits him or her, which improves the case and fun of driving.

6-5. Automatic Customization

The operation feel of the pseudo shifting operating members may be automatically customized by the control device 101. As an example, the operation feel may be customized according to the road surface environment. The control device 101 acquires information about the road surface environment on which the battery electric vehicle 100 is traveling by using a sensor mounted on the battery electric vehicle 100. For example, an image of the road surface on which the battery electric vehicle 100 is traveling is captured by a camera, and the information about the road surface environment is acquired by analyzing the captured image. When the battery electric vehicle 100 is traveling on an uneven road surface, the reaction force and amount of stroke of the pseudo shifting operation members are reduced. This allows the driver to operate the pseudo shifting operation members with a light operation feel and get less tired in situations that require frequent gear changes On the other hand, when the battery electric vehicle 100 is traveling on a flat road surface, the control device 101 increases the reaction force and amount of stroke of the pseudo shifting operation members. This allows the driver to operate the pseudo shifting operation members while feeling a solid feedback from them in situations that require less frequent gear changes, which reduces the possibility of erroneous operations.

In this case, the driver can select whether to automatically customize the operation feel. When the driver does not select automatic customization, the control device 101 will not automatically customize the operation feel.

7. Second Embodiment: Customization of Shift Shock

In the battery electric vehicle 100, shift shock occurs when the virtual transmission torque changes discontinuously in response to a change in virtual gear ratio. In the manual mode in an initial state, shift shock is determined by the amount of change in virtual transmission torque, and shift shock in a real manual transmission internal combustion engine vehicle is replicated. However, since the virtual transmission torque in the battery electric vehicle 100 is virtual torque, it is possible to control the magnitude of the shift shock.

In the present embodiment, the magnitude of the shift shock is customized according to the driver's request or the surroundings of the battery electric vehicle 100. When downshifting, the control device 101 can reduce the shift shock by increasing the virtual engine speed. When upshifting, the control device 101 can reduce the shift shock by reducing the virtual engine speed. The opposite operation is performed to increase the shift shock.

Possible examples of a situation in which the driver wants to customize the magnitude of the shift shock are as follows. For example, when there is a passenger in the battery electric vehicle 100, the driver may want to eliminate or reduce the shift shock. Alternatively, when the battery electric vehicle 100 simulates a vehicle model that causes large shift shock, the driver may want to enjoy the operation feel and the engine sound but may not want to experience the large shift shock. When the battery electric vehicle 100 is traveling on a winding road such as a mountain road, the driver may want to set the shift shock to large. This is because it is easier for the driver to drive on a winding road etc. if he or she physically feels a gear change through the shift shock.

The magnitude of the shift shock may be manually settable by the driver. The driver can select the magnitude of the shift shock via the HMI 20. Specifically, for example, a selection screen for selecting from "with shift shock" and "no shift shock" is displayed on the touch panel display. Alternatively, a selection screen for selecting the magnitude of the shift shock from three levels, "large," "medium," and "small," may be displayed.

The magnitude of the shift shock may be automatically controlled by the control device 101. For example, the control device 101 may adjust the magnitude of the shift shock according to the road conditions acquired from a sensor. In this case, the shift shock may be increased when the battery electric vehicle 100 is traveling on a winding road, and may be reduced when the battery electric vehicle 100 is traveling on a straight road. In this case as well, the driver can select whether to automatically set the shift shock.

As described above, allowing to customize whether to cause the shift shock and the magnitude of the shift shock according to the driver's preference or circumstances improves the case and fun of driving the battery electric vehicle 100 for the driver.

8. Third Embodiment: Customization of Clutch Operation Model

When the paddle shift mode or the stick shift mode with no clutch operation is selected as the shift mode, the clutch operation amount is calculated using a clutch operation model. The clutch operation model is a model that simulates clutch operations of a model driver by software, and the vehicle behavior that is implemented by clutch operations of the model driver varies depending on the type of model driver. In the present embodiment, the clutch operation model can be selected from a plurality of models in order to implement the vehicle behavior desired by the driver or passenger.

The driver selects his or her preferred clutch operation model via the HMI 20. Each clutch operation model may be given a name that represents its vehicle behavior so that the driver can imagine the vehicle behavior of the clutch operation model from its name. For example, the clutch operation model can be selected from three modes: "exciting mode," "fun mode," and "quiet mode." The "exciting mode" is a mode in which the model driver is a racing driver, and is characterized by sharp driving with a sense of acceleration and deceleration. The "fun mode" is a mode in which the model driver is a taxi driver, and is characterized by driving that causes less shock and that is gentle on occupants. The "quiet mode" is a mode in which the model driver is a delivery driver who delivers precision machines, and is characterized by driving that causes less shock. For example, this mode is suitable for cases where the battery electric vehicle 100 is loaded with fragile items. These options together with a description of their individual features are displayed on a selection screen on the display.

What is claimed is:

1. A battery electric vehicle that includes an electric motor as a driving source, the battery electric vehicle comprising:

a driving operation member used to drive the battery electric vehicle;

a pseudo shifting operation member that imitates an operation member used to perform a shifting operation of a manual transmission internal combustion engine vehicle; and a processor that controls the battery electric vehicle according to an operation of the driving operation member, wherein the processor is configured to execute, according to a selection by a driver, a control mode in which an amount of an operation input to the pseudo shifting operation member by the driver is associated with torque of the electric motor, the pseudo shifting operation member is configured to change movement of the pseudo shifting operation member that occurs in response to the operation performed by the driver, the pseudo shifting operation member is configured to change an amount of stroke of the pseudo shifting operation member that occurs in response to the operation performed by the driver, and the pseudo shifting operation member is configured such that a movable range thereof in response to the operation performed by the driver can be increased or decreased.

2. The battery electric vehicle according to claim 1, wherein the pseudo shifting operation member includes a reaction force mechanism that generates a reaction force in response to the operation performed by the driver, and the reaction force mechanism is configured to change a magnitude of the reaction force that is generated in response to the operation performed by the driver.

3. The battery electric vehicle according to claim 2, wherein the reaction force mechanism is configured to allow the driver to set the magnitude of the reaction force that is generated in response to the operation performed by the driver.

4. The battery electric vehicle according to claim 3, wherein the magnitude of the reaction force that is generated in response to the operation performed by the driver is configured to be set via a communication device carried by the driver and connectable to the battery electric vehicle or via an in-vehicle device mounted on the battery electric vehicle and including a display unit.

5. The battery electric vehicle according to claim 2, wherein the processor is configured to set the magnitude of the reaction force that is generated in response to the operation performed by the driver, according to a road surface environment of a road surface on which the battery electric vehicle is traveling.

6. The battery electric vehicle according to claim 1, wherein the driving operation member includes an accelerator pedal, and the pseudo shifting operation member includes a pseudo H-shifter imitating an H-shifter of a manual transmission, and a pseudo clutch operation device imitating a clutch operation device.

7. The battery electric vehicle according to claim 6, wherein the processor is configured to change the torque of the electric motor according to a shift position selected by the pseudo H-shifter, an amount of operation of the pseudo clutch operation device, and an amount of operation of the accelerator pedal, when in the control mode.

8. The battery electric vehicle according to claim 7, wherein the processor is configured to generate torque shock simulating shift shock by changing the torque of the electric motor according to the shift position selected by the pseudo H-shifter and the amount of operation of the pseudo clutch operation device, when in the control mode, and a magnitude of the torque shock is settable by the driver.

9. The battery electric vehicle according to claim 1, wherein the driving operation member includes an accelerator pedal, and the pseudo shifting operation member includes a pseudo sequential shifter imitating a sequential shifter of a manual transmission.

10. The battery electric vehicle according to claim 9, wherein the processor is configured to change the torque of the electric motor according to a shift position selected by the pseudo sequential shifter and an amount of operation of the accelerator pedal, when in the control mode.

11. The battery electric vehicle according to claim 1, wherein the driving operation member includes an accelerator pedal, and the pseudo shifting operation member includes a pseudo H-shifter imitating an H-shifter of a manual transmission.

12. The battery electric vehicle according to claim 11, wherein the processor is configured to change the torque of the electric motor according to a shift position selected by the pseudo H-shifter and an amount of operation of the accelerator pedal, when in the control mode.

13. The battery electric vehicle according to claim 1, wherein a maximum value of the amount of stroke changed by the pseudo shifting operation member in response to the operation performed by the driver is changeable.

* * * * *